INVENTOR.
PHILIP BONO

ATTORNEYS

Jan. 3, 1967

JAMES E. WEBB 3,295,790

ADMINISTRATOR OF THE NATIONAL AERONAUTICS
AND SPACE ADMINISTRATION
RECOVERABLE SINGLE STAGE SPACECRAFT BOOSTER

Filed June 16, 1964

INVENTOR.
PHILIP BONO

BY
*S. E. Smallwood*

ATTORNEYS

Jan. 3, 1967   JAMES E. WEBB   3,295,790
ADMINISTRATOR OF THE NATIONAL AERONAUTICS
AND SPACE ADMINISTRATION
RECOVERABLE SINGLE STAGE SPACECRAFT BOOSTER

Filed June 16, 1964   3 Sheets-Sheet 3

INVENTOR.
PHILIP BONO
BY
S.E. Smallwood
ATTORNEYS

United States Patent Office 3,295,790
Patented Jan. 3, 1967

3,295,790
RECOVERABLE SINGLE STAGE SPACECRAFT BOOSTER
James E. Webb, Administrator of the National Aeronautics and Space Administration, with respect to an invention of Philip Bono
Filed June 16, 1964, Ser. No. 375,682
10 Claims. (Cl. 244—1)

The invention described herein was made in the performance of work under a NASA contract and is subject to the provisions of Section 305 of the National Aeronautics and Space Act of 1958, Public Law 85-568 (72 Stat. 435; 42 U.S.C. 2457).

This invention relates generally to space vehicle systems and more particularly to a single stage-to-orbit recoverable vehicle capable of injecting large payloads into earth orbit.

In the search for booster configurations to place large payloads (on the order of 1 million pounds) in a circular earth orbit (at an altitude of at least 175 nautical miles) economically and without reaching out too far beyond state-of-the-art structural materials and propellants, it was apparent that present day configurations were not adequate. Gross improvements in performance, reliability and cost were dictated. In the present art of boosting spacecraft into earth orbit, multiple tandem stages are used to provide the thrust necessary to inject the spacecraft or satellite payload into the desired orbit. The successive stages have complete propellant storage capacity, plumbing, engines and control equipment for the operation of the booster stage which, when its operational capacity has been depleted, is then jettisoned from the remaining booster upper stages and the mission payload. Each of the successive stages are jettisoned when they have expended the propellants they carried or an earlier programmed separation was commanded and executed. These booster stages were not recovered for reuse and indeed they would offer very few reuseable components which would be hardly worth retrieving.

As the payload is increased there is an exponential increase in the total gross weight of the vehicle due to (1) the increased propellants needed to lift and accelerate the additional payload weight, (2) the increased structural weight for the additional propellant tank capacity, (3) other structural weight increases due to increased thrust distribution structural requirements, larger or greater number of engines, and, finally, (4) increased propellant weight and tank storage, etc. for the previously mentioned increased propellant quantity. Just considering the increased propellants required to place an additional unit mass of payload in orbit, there is an additional propellant requirement which takes the form of the finite sum of an infinite series of mass terms. These considerations and the practical limitation on the amount of total thrust which can be developed in the first stage of a multi-stage vehicle have proved insurmountable when a proposed 1 million pound payload and a 175 nautical mile orbit capability has been considered.

An analysis of this problem by the inventor has brought forth guidelines for directing the conceptional development of solutions. The inventor felt that the system design should incorporate the following features:
(1) Reduction in size of the airborne vehicle portion of the system for the same payload. (The height of the vehicle should be reduced to simplify ground handling operations and to reduce the size, cost and complexity of supporting facility and equipment);
(2) Reduction in the number of stages required;
(3) Improvement in economy;
(4) Adaptability of the system to differing mission requirements;
(5) Improvement in reliability; and
(6) Reduction of overall noise level in the vicinity of the launching operations to levels of human and structural toleration.

The present invention resulted from the development of a conception involving a system in which the major component parts were recoverable and reuseable and in which some major subsystems were adapted for use for portions of the mission other than its primary purpose, as for example, using the booster rocket engine for injection into and ejection from orbit and terminal retro-thrust during recovery on earth.

It is therefore an object of the present invention to provide a space vehicle system capable of injecting a large payload into an earth orbit.

It is another object of the present invention to provide a space vehicle system in which the total average cost per pound placed in orbit in large units is economical.

It is a further object of the invention to provide a space vehicle system capable of injecting large payloads into earth orbit in which the exhaust jet noise level in areas adjacent the launch area is reduced to or below human and structural tolerational levels.

Another object is to provide a vehicle capable of recovery and reuse.

Still another object of the invention is to provide a space vehicle which has an improved payload and propellant mass to structural mass ratio.

A further object of the present invention is to provide a space vehicle capable of mission modification without major structural redesign.

Another object of the invention is to provide a single stage reuseable booster vehicle in which the propellants are carried in tanks which carry no thust loads.

A still further object of the invention is to provide a space vehicle system capable of specific component test and possible modification after use to establish or develop high component and system reliability.

These and other objects of the present invention, obvious to those skilled in the art, are obtained by the use of a single stage booster with parallel, individually separable liquid hydrogen propellant tanks detachably mounted symmetrically about the booster main body which houses a single spherical liquid oxygen oxidizer tank and an annular segmented isentropic plug nozzle rocket engine. The individual propellant tanks have incorporated therein means of ocean recovery while the booster main body is recoverable on land near the launch site. In addition to providing thrust to the vehicle during the boost phase of flight, portions of the annular segmented engine and fuel contained in auxiliary main body tanks are used for injection of the booster main body with its payload section into earth orbit, ejection of the main body from earth orbit after the mission payload section has been separated and placed in orbit, and finally for retro-thrust during land recovery. The isentropic plug provides high re-entry drag and also acts as the basic heat shield during re-entry into the earth's atmosphere.

The fuel tanks and the booster main body have aerodynamic drag devices for reducing the terminal velocity of the descending bodies in the lower portions of the earth's atmosphere. Included in the propellant tank recovery system are means to separate selected tanks from the booster main body during the boost phase of flight when their fuel capacity is depleted, means to maintain an internal pressure within the tanks within a specified range, and means to reduce the velocity of the tanks to values at impact in the ocean such that the dynamic pressure of the ocean impact will not collapse the tanks.

The ground based launch complex is designed to attenuate and suppress horizontal noise propagation of the booster engine jet exhaust by reflecting and dispersing a large portion of the unabsorbed sound pressure waves above the launch complex. Further sound level attenuation is accomplished by utilizing the acoustic property of water in absorbing acoustic energy.

Greater understanding of the invention may be obtained by reference to the following detailed description of an embodiment thereof taken in conjunction with the attached drawings in which.

Figure 5:
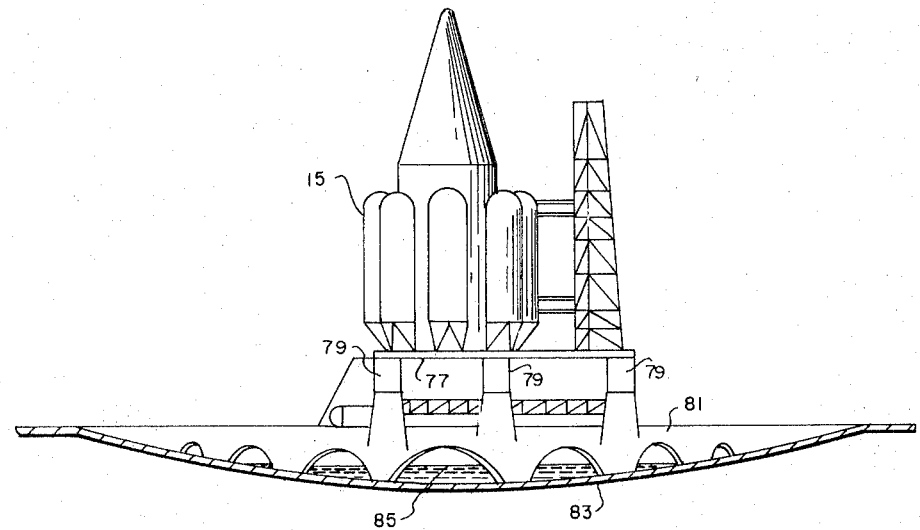
FIGURE 5 is an elevational view, partly in section, of the launch complex showing the vehicle on the launch pad and the jet blast deflector.

Referring now to the drawings and briefly to FIGURE 5, a single stage spacecraft booster with parallel externally mounted fuel tanks is shown on a launch pad preparatory to launching. With the general configuration of the vehicle as shown in FIGURE 5 in mind and referring now particularly to FIGURE 1, the vehicle is shown partly in elevation and partly in section, the portion in elevation conforming to the vehicle configuration during recovery while the portion in section gives the vehicle configuraton during the boost phase of flight. The booster is provided with a segmented annular plug nozzle rocket engine 11 extending circumferentially around an isentropic plug 13 which provides the inner portion of the engine nozzle. The plug is regeneratively cooled in a conventional manner by circulating cryogenic fuel through a tubing system near the surface of the plug prior to feeding the fuel into the engine. The fuel (liquid hydrogen) is stored in eight parallel individual tanks 15 detachably mounted to the exterior of the booster symmetrically around the base thereof. Each of the fuel tanks is provided with two upper attachments 17 employing explosive bolts and two half-hinge vertical load bearing lower attachments 19 at the trailing edge of tank skirt 20 (see also FIGURE 3). The booster main body is provided with a drogue parachute and four main parachutes 22. A single spherical oxidizer (liquid oxygen) tank 21 is attached to the booster thrust structure by a frusto-conical support member 23. Tank 21 is fueled through liquid oxygen filler 25 and is vented to allow boil off of the liquid oxygen by vent valves 27 in vent line 29.

The liquid hydrogen tanks are provided with a vented line 30 having a pressure relief vent valve 31 communicating with vent port 32 and a fuel quantity probe 33. Fuel is fed from the tank through fuel line 34, quick disconnect attachment 35 and valves 36 and 37 into an annular fuel manifold 39. Each tank is provided with a parachute 40 which is deployable automatically by a pressure sensing device such as an aneroid barometer at a preselected pressure which corresponds to a desirable altitude for parachute deployment. All of the tanks are fueled on the launch pad through fuel fill line 41 which communicates with fuel manifold 39. Oxidizer is fed from oxidizer tank sump 43 through oxidizer feed line 45 into an annular manifold 47 similar to manifold 39 and contiguous therewith. Included in oxidizer feed line 45 is a turbo pump 49 which provides adequate feed pressure of the oxidizer during engine operation, the exhaust of which exhausts through exhaust line 51 to an exit port 52 in the isentropic plug 13 at the stagnation point of the plug (when the plug is used as a re-entry heat shield to be discussed hereinafter.) Similarly, there is a turbo feed pump in the liquid hydrogen system which supplies the propellant in the desired quantities at the desired pressure. There is provided auxiliary liquid hydrogen tanks 53 within the booster main body to supply fuel for orbit injection and ejection and for terminal retro-thrust during land recovery. There are tanks 55 which store cryogenic fuel used for re-entry cooling of the isentropic plug nozzle 13. The attitude of the vehicle is corrected by attitude control motors 57 fueled by a $N_2O_4$ tank 59. Motors 57 also provide a portion of the payload separation thrust.

The booster has four symmetrically positioned landing legs 61 having landing feet 63 illustrated in solid line in a landing configuration and by broken lines in a retracted position.

The general external contour of the vehicle is essentially a frusto-conical monocoque interstage structure 65 of sandwich construction which is joined to a cylindrical monocoque structure 67 at juncture 69. The division of the vehicle at juncture 69 allows easier handling of the vehicle during refurbishment and transportation to the launch pad assembly facility.

Figure 2:
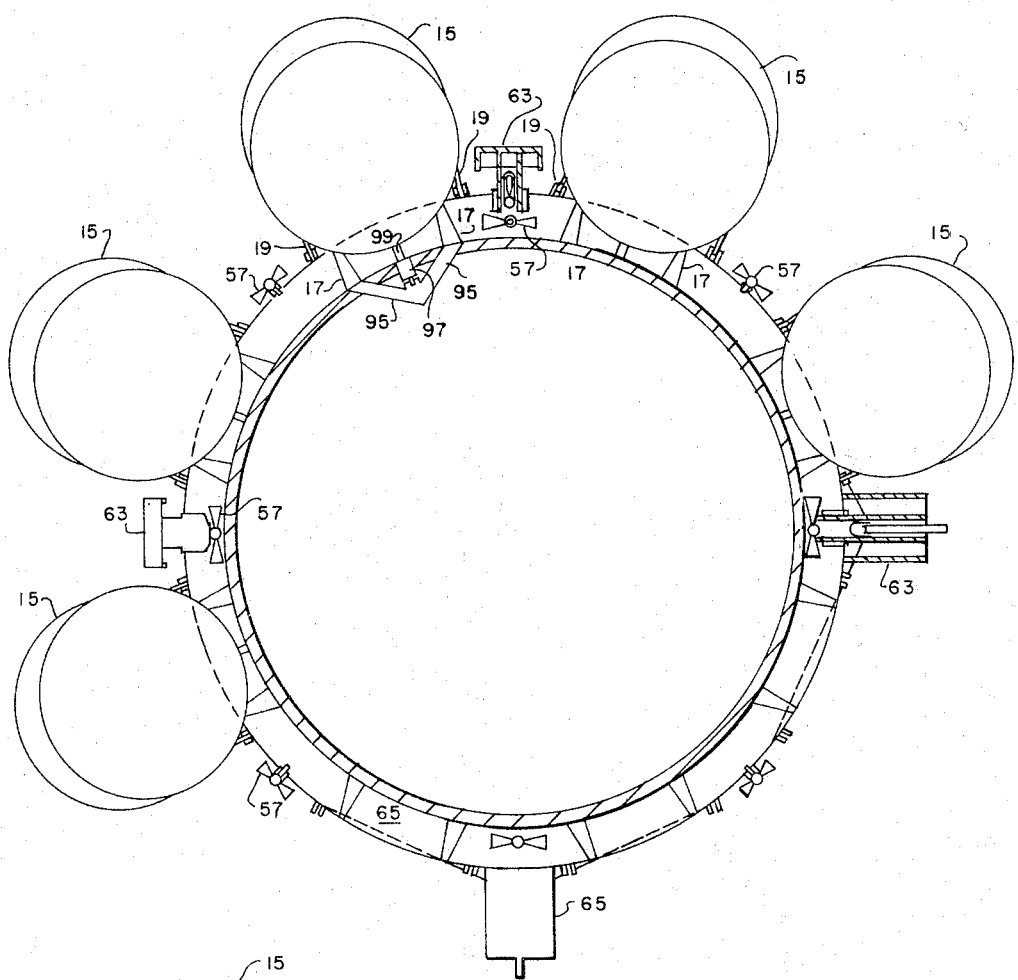
FIGURE 2 is a transverse sectional view of the vehicle shown in FIGURE 1 taken along the section 2—2.

Referring now to FIGURE 2, the vehicle and some of the fuel tanks 15 are shown in section illustrating more clearly the fuel tank upper explosive bolt attachments 17 and the lower half-hinge attachments 19. Also shown are gas passages 95 in intercommunication between explosive bolts 17 and a fuel tank jettisoning cylinder 97 which has a piston (not shown) conventionally arranged therein to provide an outward force to the fuel tank through rods 99 when the explosive bolt attachments are detonated.

Figure 3:
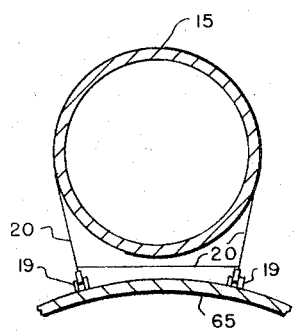
FIGURE 3 is a sectional view of the liquid hydrogen tank taken along the section 3—3 of FIGURE 1 illustrating the half-hinge lower attachment of the tank to the vehicle main body.

FIGURE 3 illustrates more clearly the lower half-hinge attachments 19 of the fuel tank skirt 20 to the booster interstage structure 65.

Figure 1:
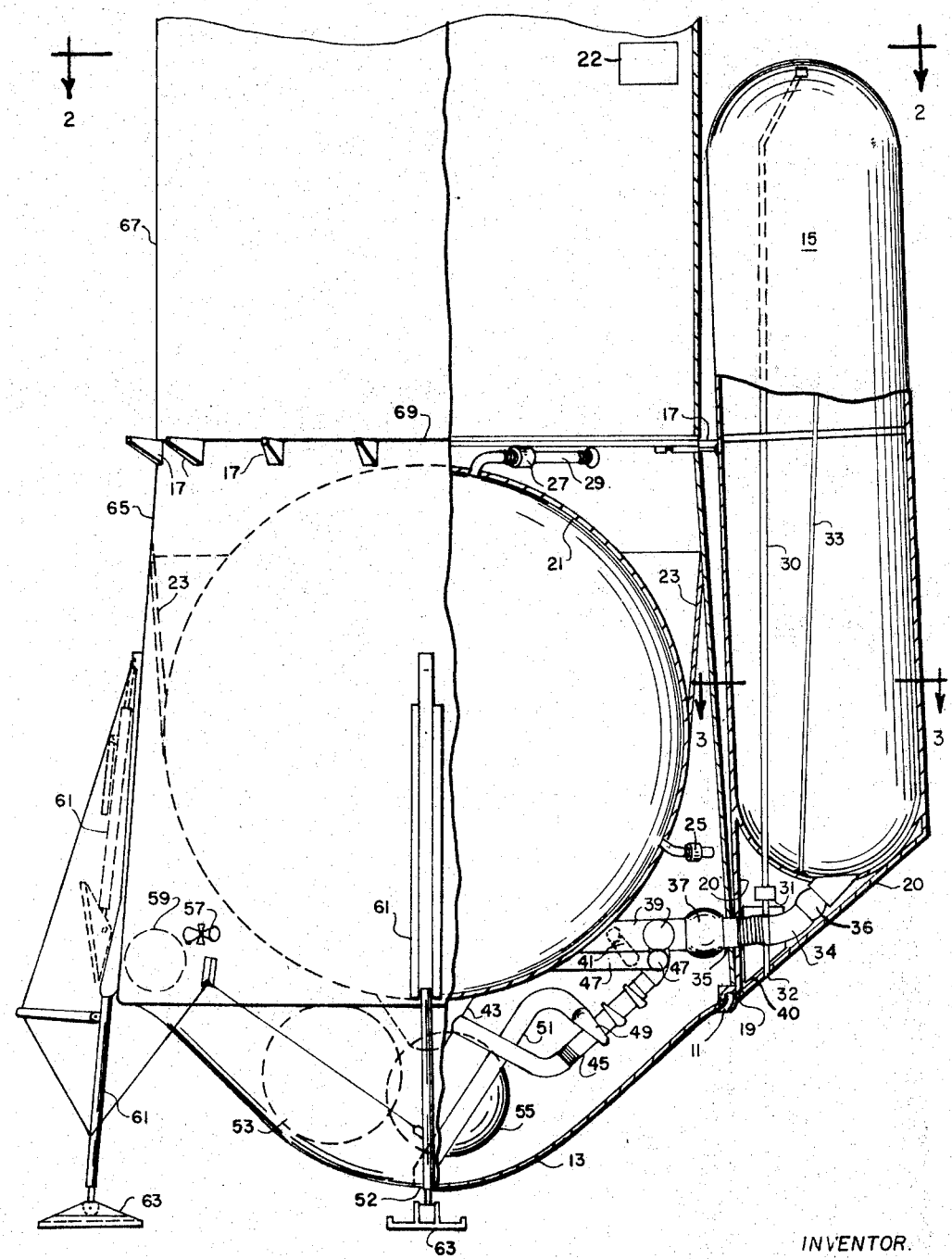
FIGURE 1 is an elevational view, partly in section, of the lower portion of the vehicle main body showing the liquid oxygen tank, the engine and one of the liquid hydrogen fuel tanks.
Figure 4:
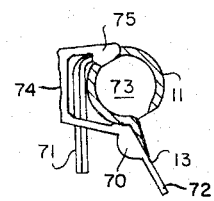
FIGURE 4 is a sectional view of the annular rocket engine.

FIGURE 4 is a sectional enlargement of the annular engine 11 shown in FIGURE 1. Fuel and oxidizer feed lines 71 feed propellants to the engine combustion chamber 73 through propellant injector 75. Additionally, liquid hydrogen from an annular reservoir 70 is used to regeneratively cool the engine's isentropic plug 13 by circulation through regenerative cooling tubes 72. This liquid hydrogen is also fed into injector 75 by a conduit 74 and there properly metered with the appropriate quantity of liquid oxygen before injection into the engine's combustion chamber 73.

Having described the structure of the vehicle, its operation will now be briefly discussed with reference to FIGURES 5, 6, 7, and 8. The booster is shown on the launch pad in FIGURE 5 prior to launch. The launch pad is provided with the usual support structure including apparatus to hold the vehicle on the launch pad after ignition of the rocket engine prior to liftoff while the annular plug nozzle engine is building up to its rated liftoff thrust. Since the booster employs an annular plug nozzle engine, a new approach to the exhaust deflector system was required. The concept developed includes the use of a saucer-shaped deflector which allows the engine exhaust to expand radially in all directions rather than being channeled in one or two directions as is the approach on present day bucket type blast deflectors. Such deflectors would result in intolerable acoustic loading of the missile structure during the first few nozzle diameters of flight from the launch pad.

Launch platform 77 is supported at the top level of the deflector by three sets of pedestals 79 on two arched bridges 81. These bridges are an extension of the missile crawler approach ramps and are used for the emplacement and removal of the launch platform.

Beneath the support structure is a blast deflector 83 of parabolic cross-section having its focus several hundred feet above the missile. The diameter of the blast deflector is on the order of twenty nozzle diameters. The bottom of the deffector is filled with water to a level such that the diameter of the water surface 85 is approximately 250 feet. The acoustic sound suppression afforded by the nozzle blast deflector design will be discussed more fully hereinafter.

During and immeditaely after launch of the vehicle, fuel from four symmetrically oriented fuel tanks 15 is used and upon depletion of the fuel from these tanks the four tanks are simultaneously separated from the vehicle through the detonation of explosive bolt attachments 17. At the instant of the tank's forward separation, a horizontal velocity is given the tank by a tank jettisoning cylinder 97 mentioned above. The tank rotates on a bifurcated distal end of the attachment fitting around a pin comprising the aft half-hinge attachments 19. The tanks will thus reach a point where they clear the booster main body and fall free.

Figure 6:
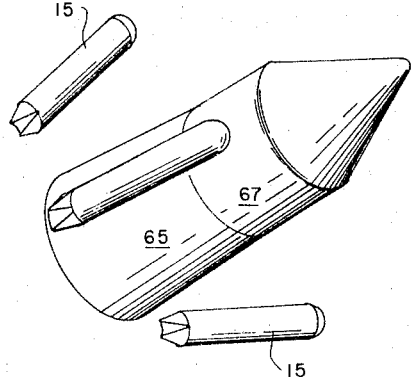
FIGURE 6 is a perspective view of the booster in flight during separation of the number 5 and 6 liquid hydrogen fuel tank.
Figure 7:
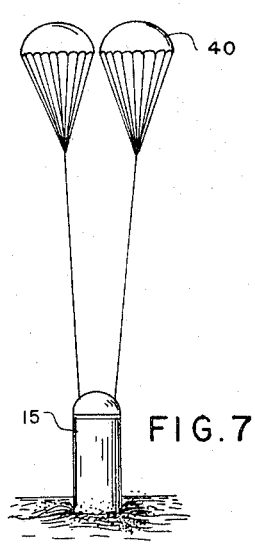
FIGURE 7 is an elevational view of a fuel tank illustrating the method of recovery thereof.
Figure 8:
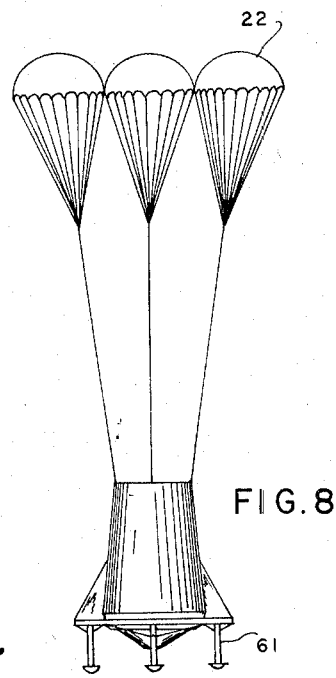
FIGURE 8 is an elevational view of the booster main body illustrating the method of recovery thereof.

As the vehicle accelerates upward through the atmosphere, fuel is used from selected ones of the fuel tanks and, when the amount of fuel in the selected tanks has been substantially but not completely depleted, valves 36 and 27 are closed, and the tanks are separated in diametrically opposed pairs. A typical configuration of the vehicle when fuel tanks number 5 and 6 are separated is shown in FIGURE 6. Upon separation of the fuel tanks, the tanks are then free bodies and continue to ascend due to their upward momentum at separation. The earth's gravitational field will overcome this upward momentum and the fuel tanks will reach a summit of their ascent and will then descend toward the earth reaching a terminal velocity. During this period the fuel tank has been tumbling slowly, exhibiting greater surface areas to aerodynamic drag forces. Each of the tanks 15 are equipped with automatic pressure relief valves 31. A certain amount of trapped residual cryogenic fuel is substantially retained in the tanks 15 after they are separated from the booster main body, and the aerodynamic heating of the tank causes boil off of the trapped liquid hydrogen which increases the internal pressure within the tank. Thus by the use of a pressure relief valve 31 programmed to maintain the internal pressure within the tanks between prescribed limits, a positive internal pressure of approximately 37 pounds per square inch absolute is maintained within the tank to prevent collapse thereof upon impact in the ocean. When the tanks have descended to approximately 30,000 feet parachutes 80 are deployed to reduce the terminal velocity of the tanks to approximately 57 feet per second at sea level when the tanks impact in the ocean. The internal pressure of 37 pounds per square inch absolute within the tanks is sufficient to prevent the collapse of the tank due to the dynamic pressures developed by the ocen impact.

The parallel-arranged disposable (but recoverable) liquid hydrogen tanks 15 are depleted in diametrically opposed pairs during boost and then jettisoned (see FIGURE 5), except for the first set of four tanks which are emptied and simultaneously separated soon after maximum dynamic pressures are encountered. Since the tanks contain only fuel rather than both propellants, the cross-plumbing complexity in order to continuously replenish a center tank of a parallel-staged vehicle is avoided. Also, no propellant tanks are required to carry thrust loads.

Since the fuel tank is stripped of the engine, engine thrust structure, and bracket-mounted electronic equipment, it is less likely to be damaged by water impact. No bulky masses are concentrated in the tank which are likely to tear loose when the tank impacts in the ocean. Three recovery parachutes (only two of which are shown in the drawings) are sized to allow each tank to impact at a velocity such that the dynamic pressure caused by the water impact will not exceed the 37 p.s.i.a. within the tank; consequently, the tank will not collapse as mentioned above.

The first set of four liquid hydrogen tanks to be jettisoned will not be subjected to extreme temperatures either during boost or recovery. Therefore, these tanks do not require any thermal protection whatsoever. The remaining four tanks however are provided with an insulating skin covering for thermal protection from aerodynamic heating. All of the tanks, after they are jettisoned from the main vehicle during boost, are assumed to tumble slowly due to the unbalanced jettisoning forces applied to the tanks at separation. The tank separation force is generated by expanding gases generated when the explosive bolts at attachments 17, which holds each tank in place, are detonated. These gases are ducted into the cylindrical actuator (piston-cylinder combination) 97 which is extended by the increasing internal gas pressure. When the forward end of the depleted tank is thereby rotated outward, the tank automatically uncouples from the half-hinge 19 located at its aft end as described hereinabove. This condition results in a hypersonic ballistic parameter low enough so that tolerable aerodynamic heating rates are encountered due to the large area of the tank surface subjected to aerodynamic heating and the fact that the point of maximum heating continuously varies.

Since the separable tanks contain only 1 propellant (liquid hydrogen in this case), a single quick disconnect valve is required for each tank. This valve would be similar in design for those used on the Atlas booster when the two outboard engines are jettisoned.

Disposal of individual tanks during the boost phase of flight has many advantages. To begin with, an increase in the effective propellant loading fraction is realized when the vehicle weight is periodically diminished during boost. Moreover, the propellants required for orbital injection, ejection, and terminal retro thrust are reduced when the propulsion system is relieved of the weight of these additional fuel tanks. Furthermore, the recovered weight and the associated ballistic parameter are reduced, resulting in a decreased terminal velocity and the corresponding reduction in the weight of the recovery system necessary. Finally, since the vehicle size as well as its landed weight is reduced by the elimination of the massive liquid hydrogen tanks, the ground handling problems of recovery and transportation of the recovered vehicle for refurbishment are greatly alleviated.

When all external fuel is depleted or the desired altitude is attained, the vehicle is placed in earth orbit. The payload section is then separated and the booster main body ejected from orbit. The booster main body is then oriented for re-entry in an engine-first attitude during which the isentropic plug provides high areodynamic drag to the vehicle. As the plug surface 13 is aerodynamically heated, the plug regenerative cooling system is operated. Exhaust gases from the plug cooling system turbo pump is dumped overboard through port 52 at the re-entry stagnation point of the isentropic plug to prevent high temperature buildup at the stagnation point of the plug during re-entry. In order to improve the aerodynamic stability of the vehicle during re-entry, a drogue parachute is deployed at low supersonic velocities after the maximum dynamic pressure region is past to provide stability to the vehicle in the transonic range until the vehicle has reached subsonic velocity. The vehicle presents a stable subsonic configuration due to the concentration of mass of the engines ahead of the center of pressure of the descending vehicle. Main parachutes 22 are deployed after subsonic velocities are attained to further reduce the terminal velocity of the vehicle. The four landing legs 61 are extended and selected segments of the engine are ignited to provide retro-thrust thus reducing the velocity of the vehicle to near zero immediately prior to touchdown. When the landing legs are compressed at touchdown, the operating segments of the engine providing retro-thrust deceleration are shut down.

The plug-nozzle type of engine is adaptable to use as a re-entry body since, in order to assure a stable condition during recovery, the vehicle must have its center of gravity located as far forward as possible (aft direction during ascent). The engine's position, which provides the largest concentration of mass, indicates an aft end first attitude would be the best re-entry configuration. The conventional bell-nozzle engine could not survive the aerodynamic re-entry heating because the edge of the nozzle would be heated to prohibitive temperatures. The plug-nozzle engine provides a solution to this situation. The regenerative cooling used during re-entry is much more practical for a truly reuseable vehicle since the plug-nozzle engine must be cooled during the boost phase of flight anyway. The same method of cooling may be used during re-entry since the engine is inoperative during the maximum-heating regime of re-entry. A gas generator (not shown) is used to run an on-board turbo pump, which pressure feeds the liquid hydrogen cooling fluid through the cooling system. After cooling the center portion of the plug, the hydrogen is fed through the injector and discharged overboard through the annular engine throat helping to cool the combustion chamber in the process.

Acoustical problems generated by high-thrust rocket engines require special consideration when launch sites of vehicles requiring such engines are being selected. In areas occupied by unprotected humans, minimum separation distances will be established so that the threshold of pain is not approached during launch. Parameters that have been considered in determining the separation of distances required for high-thrust boost vehicles include the duration of exposure, the sound-pressure level of the noise, the frequency content of the noise, and the individual threshold of pain. Based upon such parameters, an overall sound pressure level of approximately 130 decibels has been selected as an acoustical criteria for unprotective humans. Estimates of the acoustical noise from the vehicle of the present invention are based on the engine parameters such as thrust, specific impulse, nozzle exit diameter, exhaust gas velocity, and nozzle configuration.

In addition to the problems of acoustical protection of humans is the problem of acoustical fatigue of vehicle structural elements. Vibration frequencies within various octave bands are major criteria for analyzing the vibrational amplitude of components under resonate frequencies. The deflection amplitude is inversely proportional to the square of the frequency at which the member is vibrating. The vehicle structure should therefore be designed for an acoustical load corresponding to a spectrum value of the level of noise anticipated. It appears that approximately 60,000 pounds per square inch of unused structural strength would be sufficient to compensate for the resulting acoustical fatigue in the present vehicle. An approach to a solution to the problem of reducing the acoustical energy to the values within the criterion established is presented in the form of the parabolic dish reflector 83 having a focus approximately 520 feet above the bottom of the blast reflector. With the vehicle on the launch pad, the noise source (engine) is well below the focus of the parabolic reflector surface, causing the acoustic energy to be dispersed away from the longitudinal center line of the vehicle. After the vehicle has ascended above the focus of the parabolic surface, the acoustic energy is concentrated at a point aft of the vehicle. The diameter of the parabolic reflector is approximately 20 nozzle diameters across and extends approximately 60 feet below ground level. Approximately 10 decibels noise level attenuation is provided by the parabolic shaped blast reflector 83. Moreover, by filling the bottom of the reflector with water to a level such that the diameter of the water surface is approximately 250 feet, an additional 5 decibels of sound attenuation can be acquired through the energy dissipation capacity of the water. The water will not retain the level surface 85 shown in FIGURE 5 after engine ignition, but will take on the parabolic shape of the reflector. The irregular surface of the water generated by the exhaust gases will dissipate acoustical energy in the process. Preliminary investigation suggests that acoustical baffles can be incorporated into the launch pad blast deflector further reducing the reflected noise to tolerable limits.

It can be thus seen that a single stage booster has been described which is capable of injecting large payloads into earth orbit which is recoverable for reuse. Such recoverability features means that component testing can be accomplished in realistic flight environmental conditions and causes of any failures can be more easily determined. Also, the vehicle described is adapted to differing mission requirements by merely off-loading an even number of symmetrically oriented fuel tanks and filling the liquid oxygen tank to the level needed for the fuel being carried. Neither the fuel tanks nor the oxidizer tank carry thrust loads resulting in lower weight of structure. Ground handling problems are reduced by having a vehicle of smaller vertical dimension than would otherwise be the case to handle payloads of the size considered. Finally, a novel method of exhaust jet sound suppression has been disclosed.

There has been described the invention in its novel aspects; however, it is to be understood that there has been shown merely an embodiment of the invention and that the invention is not to be limited to the structure shown and described. Obviously, numerous modifications and variations of the present invention within the invention's true spirit are possible in the light of the above teachings. It is, therefore, to be understood that within the scope of the appended claims the invention may be practiced otherwise than as specifically described herein.

What is claimed is:
1. A single stage spacecraft booster capable of boosting a payload into earth orbit comprising:
 (a) a booster main body having a longitudinal axis with a payload section and a propulsion section at opposite ends, respectively, of said longitudinal axis;
 (b) an annular combustion chamber rocket engine attached to said main body at its propulsion section end and oriented to have its resultant thrust vector substantially along said longitudinal axis toward said payload section end;
 (c) an oxidizer tank positioned within said booster main body between said payload section end and said propulsion section end;
 (d) a plurality of fuel tanks detachably and symmetrically mounted to the exterior surface of said booster main body about said longitudinal axis between said payload end and said propulsion end;
 (e) means for feeding fuel from said fuel tanks and oxidizer from said oxidizer tank to the annular combustion chamber of said engine; and
 (f) means for separating said fuel tanks from said booster main body.

2. The combination of claim 1 wherein said engine is a segmented annular rocket engine and said booster main body has an auxiliary fuel tank contained therein.

3. The combination claimed in claim 1 wherein said means for separating said fuel tanks from said booster main body include an explosive bolt upper attachment, a half-hinge lower attachment and means to give the tank a lateral velocity component at its upper attachment point when said explosive bolt attachment is detonated.

4. The combination claimed in claim 1 wherein said fuel tanks are provided with means for recovery thereof.

5. The combination claimed in claim 1 wherein said oxidizer tank is a spherical tank suspended in said booster main body by a frusto-conical tension support member, whereby said fuel tanks and said oxidizer tanks carry no thrust loads.

6. A recoverable rocket propelled spacecraft booster main body comprising:
 (a) a booster main body housing having an upper portion and a lower portion;
  (1) said upper housing being substantially cylindrical, and
  (2) said lower housing being substantially frusto-conical and attached to said upper portion at its smaller base;
 (b) a segmented annular rocket engine housed in said booster main body, the combustion chamber of said engine extending circumferentially around the larger base of said frusto-conical lower portion thereof;
 (c) an oxidizer tank within said booster main body lower portion;
 (d) an auxiliary fuel tank housed in said booster main body;
 (e) means to supply fuel from said auxiliary fuel tank and oxidizer from said oxidizer tank to said rocket engine;
 (f) a re-entry heat shield attached to said booster main body at the larger base of said frusto-conical lower portion thereof;
 (g) aerodynamic drag devices housed in said booster main body upper portion deployable to provide aerodynamic drag to said booster;
 (h) means for igniting a selected number of segments of said segmented annular rocket engine to provide terminal retro-thrust to said booster main body, fuel therefore being supplied from said auxiliary fuel tanks and oxidizer being supplied from said oxidizer tank;
 (i) whereby, said heat shield provides aerodynamic drag to said booster main body reducing the velocity thereof while, at the same time, protecting the booster main body from extreme aerodynamic heating during re-entry, said aerodynamic drag devices further reducing the velocity of said booster main body while providing dynamic and ballistic stability thereto, said ignited segments of said segmented annular rocket engines providing terminal retro-thrust deceleration to said booster main body.

7. The invention claimed in claim 6 wherein said oxidizer tank is spherical and suspended within said booster main body lower portion by a frusto-conical tension support member connected along the periphery of its larger base to said booster main body lower portion and along the periphery of its smaller base to said tank.

8. The invention claimed in claim 6 wherein:
 (a) said segmented annular rocket engine is an annular plug nozzle engine; and
 (b) said re-entry heat shield is an isentropic surface conforming to and used as the plug nozzle of said segmented annular plug nozzle engine.

9. An ocean impact recoverable cryogenic propellant tank which is used to supply a cryogenic propellant to a spacecraft booster and is then separated from said booster during the boost phase of flight of said booster, said tank having a quantity of residual cryogenic fuel remaining within said tank, comprising:
 (a) a substantially monocoque enclosure having substantially cylindrical sides;
 (b) means for maintaining the internal pressure within said enclosure within a prescribed range including a valve to relieve excessive pressures developed by the boiling off of said cryogenic liquid fuel due to aerodynamic heating of said tank; and
 (c) aerodynamic deceleration devices extendable from said enclosure at or below a preselected pressure altitude;
 (d) whereby the dynamic pressure caused by the impact of said tank in the ocean is less than the internal pressure within said tank preventing the collapse of the tank at impact.

10. A method of ocean recovery of a cryogenic liquid fuel tank which has been attached to a spacecraft booster and has supplied cryogenic fuel to said booster during the boost phase of flight comprising steps of:
 (a) retaining a predetermined quantity of residual cryogenic liquid fuel in said tank; and then
 (b) separating said tank from said booster while still within the earth's gravitational field; and then
 (c) relieving the pressure in said tank periodically as said pressure builds up due to the boiling off of said residual cryogenic liquid fuel caused by the aerodynamic heating of said tank by the atmosphere during descent of the tank; while at the same time
 (d) maintaining said pressure within said tank above a predetermined amount; and then
 (e) extending from said tank an aerodynamic drag and dynamic stabilization device;
 (f) whereby the dynamic pressure caused by the impact of said tank in the ocean is less than the internal pressure within said tank preventing collapse of said tank at impact.

References Cited by the Examiner

UNITED STATES PATENTS

| | | | |
|---|---|---|---|
| 2,925,013 | 2/1960 | Santara et al. | 89—1.7 |
| 3,081,970 | 3/1963 | Eimarsson | 244—14 |
| 3,093,346 | 6/1963 | Faget et al. | 244—1 |
| 3,105,658 | 10/1963 | Marshall et al. | 244—1 |

FERGUS S. MIDDLETON, *Primary Examiner.*